(12) United States Patent
Lee et al.

(10) Patent No.: US 8,615,193 B2
(45) Date of Patent: Dec. 24, 2013

(54) APPARATUS AND METHOD FOR RESTORING A TRANSMISSION SIGNAL FROM A RECEPTION SIGNAL TRANSMITTED THROUGH A SATELLITE COMMUNICATION DEVICE

(75) Inventors: Kyoung Cheol Lee, Yongin (KR); Dongkuk Ko, Seongnam (KR); Youn-Sang Yoo, Yongin (KR); Ho Sub Lee, Seongnam (KR); Yeon Hye Yi, Incheon (KR); Seung Jun Lee, Yongin (KR)

(73) Assignee: LIG Nex1 Co., Ltd., Seoul (KR)

( * ) Notice: Subject to any disclaimer, the term of this patent is extended or adjusted under 35 U.S.C. 154(b) by 422 days.

(21) Appl. No.: 12/986,005

(22) Filed: Jan. 6, 2011

(65) Prior Publication Data

US 2012/0045987 A1     Feb. 23, 2012

(30) Foreign Application Priority Data

Aug. 23, 2010   (KR) ........................ 10-2010-0081460

(51) Int. Cl.
*H04W 84/06* (2009.01)
*H04B 7/185* (2006.01)

(52) U.S. Cl.
USPC ........................ 455/12.1; 455/427; 455/296

(58) Field of Classification Search
None
See application file for complete search history.

(56) References Cited

U.S. PATENT DOCUMENTS 5,860,057 A * 1/1999 Ishida et al. ................. 455/12.1
6,704,546 B1 * 3/2004 Lucidarme et al. ............. 455/62

FOREIGN PATENT DOCUMENTS

JP    08-251094 A    9/1996
JP    11-041159 A    2/1999

* cited by examiner

*Primary Examiner* — Philip Sobutka

(57) ABSTRACT

Provided are a signal restoring apparatus that can restore a reception signal of a counterpart terminal and increase frequency band efficiency by estimating its own transmission signal from a reception signal transmitted from a counterpart terminal through a satellite communication device and removing the estimated transmission signal, and a method thereof. The signal restoring apparatus according to the exemplary embodiment of the present invention includes: a transmitter transmitting a transmission signal to a satellite communication device; a band spread signal generator transmitting a band spread signal to the satellite communication device; a signal estimator estimating the transmission signal included in a reception signal transmitted from a counterpart terminal through the satellite communication device on the basis of the transmission signal and the band spread signal; and a signal remover removing the estimated transmission signal from the reception signal.

12 Claims, 4 Drawing Sheets

APPARATUS AND METHOD FOR RESTORING A TRANSMISSION SIGNAL FROM A RECEPTION SIGNAL TRANSMITTED THROUGH A SATELLITE COMMUNICATION DEVICE

BACKGROUND OF THE INVENTION

1. Field of the Invention

The present invention relates to a signal restoring apparatus and a method thereof.

2. Description of the Related Art

In general, as a first transmission signal of a first terminal and a second transmission signal of a second terminal share a used frequency band through a satellite communication device, the first transmission signal of the first terminal and the second transmission signal of the second terminal are mixed with each other.

FIG. 1 is an exemplary diagram illustrating a process of transmitting and receiving a signal through a satellite communication device in the related art.

As shown in FIG. 1, when the first terminal receives the second transmission signal of the second terminal through the satellite communication device, it receives its own transmission signal, the first transmission signal u1 in addition to the second transmission signal u2 of the second terminal through the satellite communication device.

When the second terminal receives the first transmission signal u1 of the first terminal through the satellite communication device, it receives its own transmission signal, the second transmission signal u2 in addition to the first transmission signal of the first terminal through the satellite communication device. That is, each terminal receives a distorted signal u'1+u'2 in which the transmission signal of the counterpart terminal and its own transmission signal are mixed with each other through the satellite communication device.

SUMMARY OF THE INVENTION

The present invention has been made in an effort to provide a signal restoring apparatus that can restore a transmission signal of a counterpart terminal by estimating its own transmission signal from a reception signal transmitted from the+ counterpart terminal through a satellite communication device and removing the estimated transmission signal and a method thereof.

Further, the present invention has been made in an effort to provide a signal restoring apparatus that can increase frequency band efficiency by estimating its own transmission signal from a reception signal transmitted from a counterpart terminal through a satellite communication device and removing the estimated transmission signal and a method thereof.

An exemplary embodiment of the present invention provides a signal restoring apparatus including: a transmitter transmitting a transmission signal to a satellite communication device; a band spread signal generator transmitting a band spread signal to the satellite communication device; a signal estimator estimating the transmission signal included in a reception signal transmitted from a counterpart terminal through the satellite communication device on the basis of the transmission signal and the band spread signal; and a signal remover removing the estimated transmission signal from the reception signal.

Another exemplary embodiment of the present invention provides a signal restoring apparatus including: a transmitter transmitting a transmission signal to a satellite communication device; a band spread signal generator generating a band spread signal for estimating the transmission signal included in a reception signal when the transmission signal is received while being included in the reception signal transmitted from a counterpart terminal through the satellite communication device and transmitting the band spread signal to the satellite communication device; a first receiver receiving the band spread signal transmitted from the satellite communication device; a second receiver receiving the transmission signal transmitted from the counterpart terminal through the satellite communication device; a signal estimator estimating the transmission signal included in the reception signal transmitted from the counterpart terminal on the basis of the transmission signal transmitted by the transmitter, the band spread signal transmitted by the band spread signal generator, and the band spread signal received from the satellite communication device; and a signal remover removing the transmission signal estimated by the signal estimator from the reception signal element transmitted from the counterpart terminal.

The signal estimator may estimate parameters of the band spread signal received from the satellite communication device on the basis of the band spread signal generated by the band spread signal generator and estimate the transmission signal included in the reception signal transmitted from the counterpart terminal by applying the estimated parameters to the transmission signal transmitted by the transmitter.

The signal estimator may estimate the transmission signal element to which a delay time, a frequency, a phase, and a gain are reflected by the satellite communication device.

The signal remover may output the reception signal without the estimated transmission signal by offsetting the estimated transmission signal from the reception signal transmitted from the counterpart terminal.

The signal estimator may include: a parameter extracting unit extracting the parameter of the band spread signal received from the satellite communication device on the basis of the band spread signal generated by the band spread signal generator; a delay module delaying the transmission signal transmitted by the transmitter depending on a delay time in the parameter; a modulation module modulating a frequency and a phase of the delayed transmission signal depending on a frequency and a phase offset value in the parameter; and a gain adjusting module adjusting the gain of the frequency and phase modulated transmission signal depending on the gain in the parameter and outputting the transmission signal of which the gain is adjusted as the transmission signal included in the reception signal transmitted from the counterpart terminal.

The band spread signal may be an orthogonal-element signal.

Yet another exemplary embodiment of the present invention provides a signal restoring method including: transmitting a transmission signal to a satellite communication device through a transmitter; generating a band spread signal and transmitting the generated band spread signal to the satellite communication device; estimating the transmission signal included in a reception signal transmitted from a counterpart terminal through the satellite communication device on the basis of the transmission signal and the band spread signal; and removing the estimated transmission signal from the reception signal.

Still another exemplary embodiment of the present invention provides a signal restoring method including: transmitting a transmission signal to a satellite communication device through a transmitter; generating a band spread signal for estimating the transmission signal included in a reception signal when the transmission signal is received while being included in a reception signal transmitted from a counterpart terminal through the satellite communication device and transmitting the band spread signal to the satellite communication device; receiving the band spread signal received from the satellite communication device; receiving the reception signal transmitted from the counterpart terminal through the satellite communication device; estimating the transmission signal included in the reception signal transmitted from the counterpart terminal on the basis of the transmission signal transmitted by the transmitter, the generated band spread signal, and the band spread signal received from the satellite communication device; and removing the estimated transmission signal from the reception signal elements transmitted from the counterpart terminal.

According to exemplary embodiments of the present invention, a signal restoring apparatus can restore a transmission signal of a counterpart terminal by estimating its own transmission signal from a reception signal transmitted from a counterpart terminal through a satellite communication device and removing the estimated transmission signal.

According to exemplary embodiments of the present invention, a signal restoring apparatus can increase frequency band efficiency by estimating its own transmission signal from a reception signal transmitted from a counterpart terminal through a satellite communication device and removing the estimated transmission signal.

DETAILED DESCRIPTION OF THE EMBODIMENTS

Hereinafter, exemplary embodiments of a signal restoring apparatus capable of restoring a reception signal of a counterpart terminal and increase frequency band efficiency by estimating its own transmission signal from a reception signal transmitted from the counterpart terminal through a satellite communication device and removing the estimated transmission signal and a method thereof will be described with reference to FIGS. 1 to 4.

The signal restoring method and the method thereof according to the exemplary embodiments of the present invention may be applied to various terminals such as a smart phone, a notebook computer, a personal digital assistants (PDA), a portable multimedia player (PMP), a portable terminal, a mobile terminal, a Wibro terminal, an Internet protocol television (IPTV), a television, a navigation terminal, an audio video navigation (AVN), and the like as well as mobile terminals such as a mobile communication terminal, a telematics terminal, and a navigation apparatus.

Figure 1:
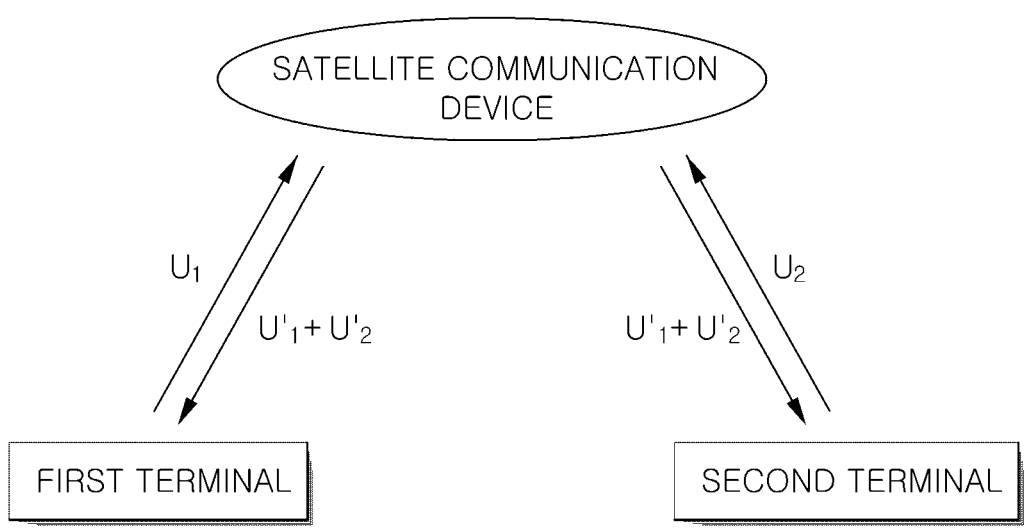
FIG. 1 is an exemplary diagram illustrating a process of transmitting and receiving a signal through a satellite communication device in the related art.
Figure 2:
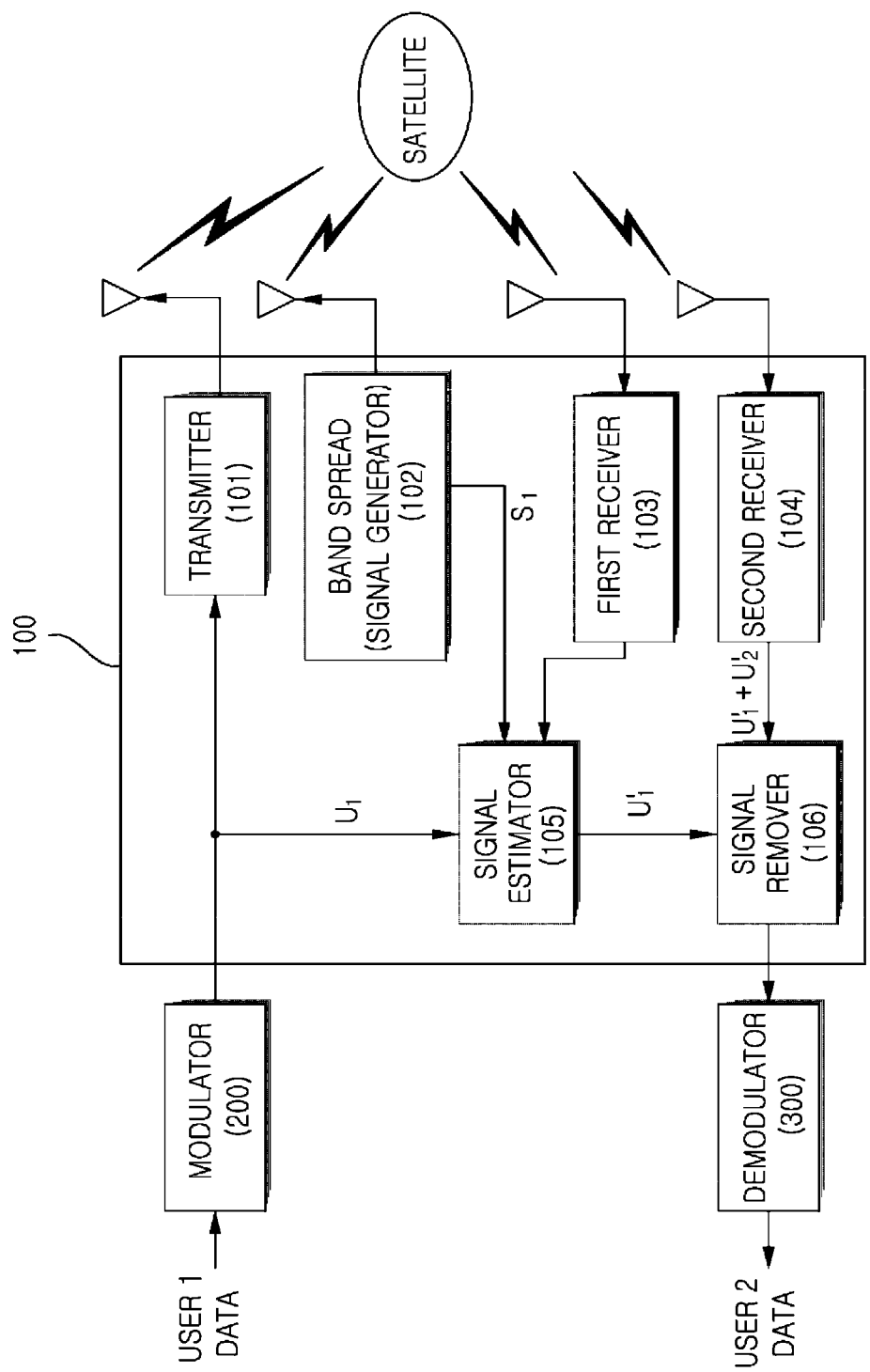
FIG. 2 is a configuration diagram of a signal restoring apparatus according to an exemplary embodiment of the present invention.

FIG. 2 is a configuration diagram of a signal restoring apparatus according to an exemplary embodiment of the present invention.

As shown in FIG. 2, the signal restoring apparatus 100 of the terminal according to the exemplary embodiment of the present invention includes a transmitter 101 generating a first transmission signal u1 and transmitting the generated transmission signal u1 to a satellite communication device (satellite); a band spread signal generator 102 generating a band spread signal (direct sequence mode) s1 for estimating a transmission signal u'1 included in the reception signal u'1+u'2 when the transmission signal u1 is received while being included in a reception signal u'1+u'2 transmitted from a counterpart terminal through the satellite communication device and transmitting the band spread signal s1 to the satellite communication device; a first receiver 103 receiving the band spread signal (band spread signal element) transmitted from the satellite communication device; a second receiver 104 receiving the transmission signal u'1+u'2 transmitted from the counterpart terminal through the satellite communication device; a signal estimator 105 estimating a transmission signal (transmission signal element) u'1 included in the reception signal u'1+u'2 transmitted from the counterpart terminal through the satellite communication device on the basis of the transmission signal u1, the band spread signal, and the band spread signal s'1 received from the satellite communication device; and a signal remover 106 outputting only a reception signal u'2 from the reception signal element u'1+u'2 transmitted from the counterpart terminal by removing the transmission signal element u'1 estimated by the signal estimator 105 from the reception signal element u'1+u'2 transmitted from the counterpart terminal. The reception signal u'2 outputted by the signal remover 106 is outputted to a speaker through a general demodulation process through a demodulator 300 (counterpart voice data, user 2 data). The transmitter 101 generates and transmits the transmission signal by general modulation of user voice data (user 1 data) through a modulator 200.

The signal estimator 105 estimates parameters of the band spread signal s'1 received from the satellite communication device on the basis of the band spread signal s1 and estimates the transmission signal element u'1 included in the reception signal u'1+u'2 transmitted from the counterpart terminal by applying the estimated parameters to the transmission signal u1. That is, the signal estimator 105 estimates the transmission signal element to which a delay time, a frequency, a phase, and a gain are reflected by the satellite communication device.

The signal remover 106 outputs the reception signal u'2 without the transmission signal element u'1 to the demodulator 300 by offsetting the transmission signal u'1 of which the gain is adjusted from the reception signal u'1+u'2 transmitted from the counterpart terminal.

Hereinafter, a detailed configuration of the signal estimator of the signal restoring apparatus 100 of the terminal according to the exemplary embodiment of the present invention will be described with reference to FIG. 3.

Figure 3:
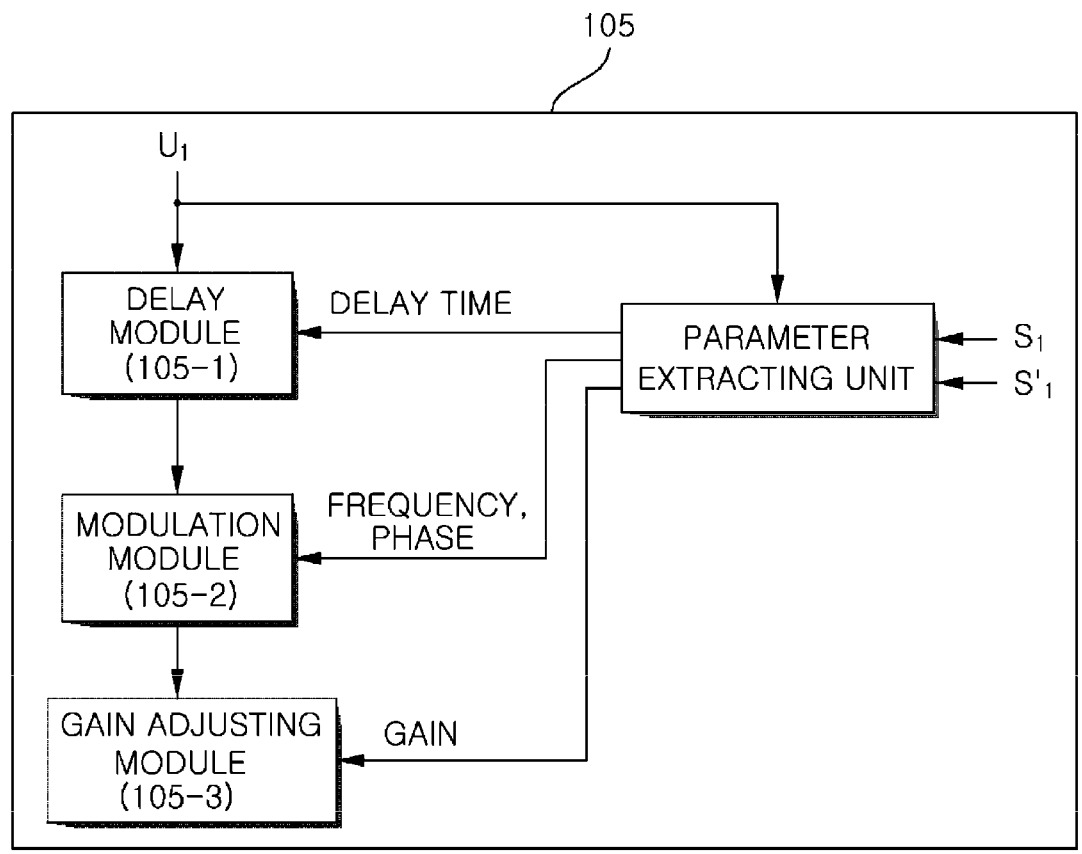
FIG. 3 is a configuration diagram illustrating a detailed configuration of a signal estimator according to an exemplary embodiment of the present invention.

FIG. 3 is a configuration diagram illustrating a detailed configuration of a signal estimator according to an exemplary embodiment of the present invention.

As shown in FIG. 3, the signal estimator includes a parameter extracting unit extracting the parameter of the band spread signal s'1 received from the satellite communication device on the basis of the band spread signal s1; a delay module 105-1 delaying the transmission signal u1 depending on a delay time in the parameter; a modulation module 105-2 modulating a frequency and a phase of the delayed transmission signal u1 depending on a frequency and a phase offset value in the parameter; and a gain adjusting module 105-3 adjusting the gain of the frequency and phase modulated transmission signal u1 depending on the gain in the parameter and outputting the gain adjusted transmission signal as the transmission signal element u'1 included in the reception signal u'1+u'2 transmitted from the counterpart terminal.

A least-mean-square (LMS) algorithm may be used in order to estimate the delay time, the frequency, the offset value, and the gain and since a method of estimating the delay time, the frequency, the phase offset value, and the gain from a predetermined signal on the basis of a reference signal is a known technology, a detailed description thereof will be omitted.

The band spread signal may have an orthogonal structure (orthogonal-element signal) in order to minimize interference effect in a band through spreading of a frequency band and prevent the band spreading signals from interfering with each other.

The signal restoring apparatus according to the exemplary embodiment of the present invention restores a reception signal of the counterpart terminal by estimating its own transmission signal from the reception signal transmitted from the counterpart terminal through the satellite communication device and removing the estimated transmission signal.

Hereinafter, a signal restoring method according to an exemplary embodiment of the present invention will be described with reference to FIGS. 2 and 4.

Figure 4:
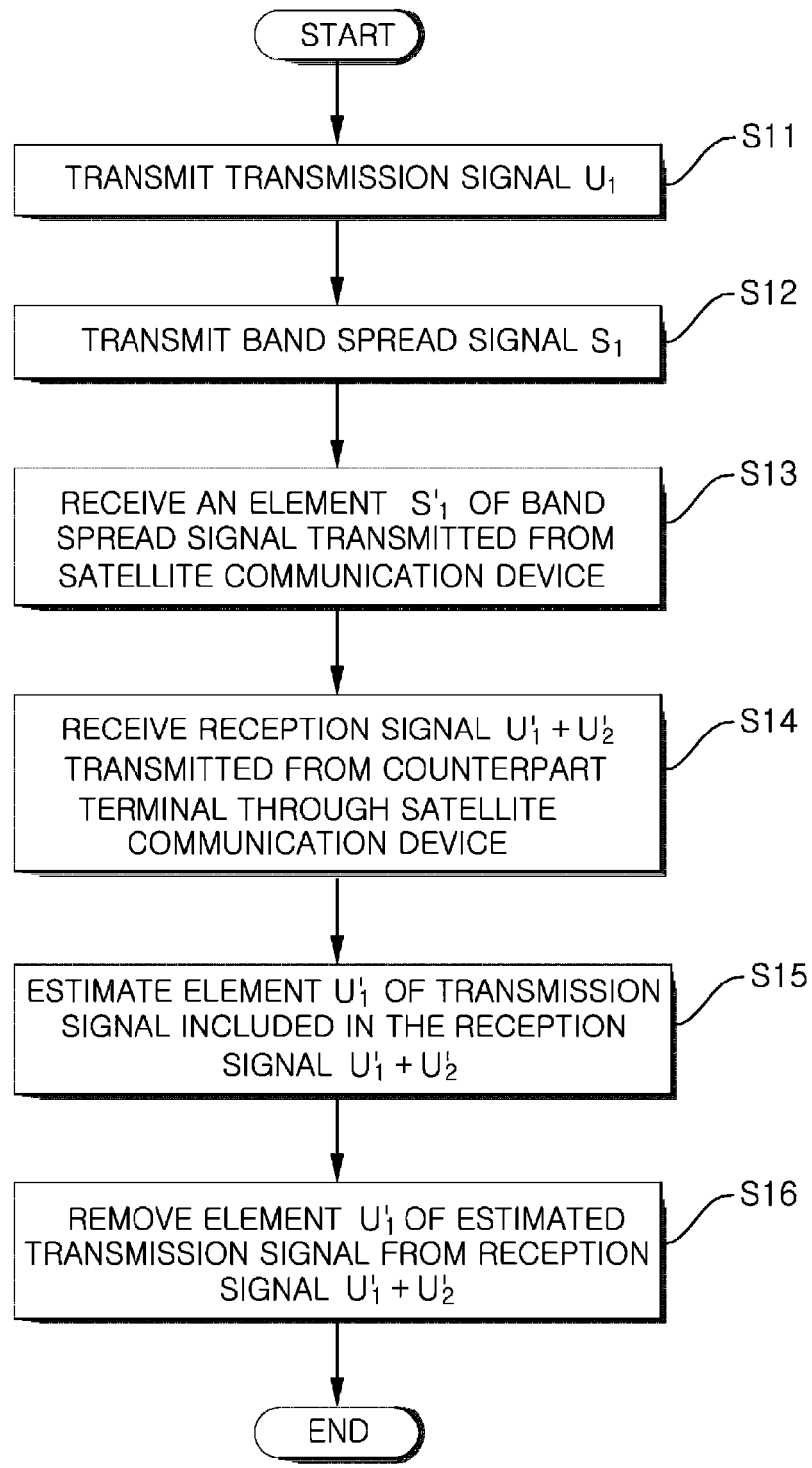
FIG. 4 is a flowchart illustrating a signal restoring method according to an exemplary embodiment of the present invention.

FIG. 4 is a flowchart illustrating a signal restoring method according to an exemplary embodiment of the present invention.

First, the modulator 200 modulates user data (user 1 data) and outputs the modulated signal to the transmitter 101.

The transmitter 101 generates the transmission signal u1 on the basis of the modulated signal and transmits the generated transmission signal u1 to the satellite communication device (satellite) (S11).

The band spread signal generator 102 generates the band spread signal (direct sequence mode) s1 for estimating the transmission signal u'1 (transmission signal element) included in the reception signal u'1+u'2 when the transmission signal u1 is received while being included in the transmission signal u'1+u'2 transmitted from the counterpart terminal through the satellite communication device and transmits the band spread signal s1 to the satellite communication device (S12).

The first receiver 103 receives the band spread signal (band spread signal element) s'1 transmitted from the satellite communication device (S13) and outputs the received band spread signal (band spread signal element) s'1 to the signal estimator 105.

The second receiver 104 receives the reception signal u'1+u'2 transmitted from the counterpart terminal through the satellite communication device (S14) and output the received reception signal u'1+u'2 to the signal remover 106. For example, as a transmission signal of a first terminal and a second transmission signal of a second terminal share a used frequency band through a satellite communication device, the first transmission signal of the first terminal and the second transmission signal of the second terminal are mixed with each other. Therefore, when the first terminal receives the second transmission signal of the second terminal through the satellite communication device, it receives its own transmission signal, i.e., the first transmission signal in addition to the second transmission signal of the second terminal through the satellite communication device. When the second terminal receives the first transmission signal of the first terminal through the satellite communication device, it receives its own transmission signal, the second transmission signal in addition to the first transmission signal of the first terminal through the satellite communication device. That is, each terminal receives a distorted signal in which the transmission signal of the counterpart terminal and its own transmission signal are mixed with each other through the satellite communication device.

The signal estimator 105 estimates the transmission signal (transmission signal element) u'1 included in the reception signal u'1+u'2 transmitted from the counterpart terminal through the satellite communication device on the basis of the transmission signal u1, the band spread signal s1, and the band spread signal s'1 received from the satellite communication device (S15) and outputs the estimated transmission signal u'1 to the signal remover 106. For example, the signal estimator 105 estimates parameters of the band spread signal s'1 received from the satellite communication device on the basis of the band spread signal s1 and estimates the transmission signal element u'1 included in the reception signal u'1+u'2 transmitted from the counterpart terminal by applying the estimated parameters to the transmission signal u1.

The signal remover 106 outputs only the reception signal u'2 of the reception signal component u1'+u'2 transmitted from the counterpart terminal to the demodulator 300 by removing the transmission signal element u'1 estimated by the signal estimator 105 from the reception signal element u'1+u'2 transmitted from the counterpart terminal (S16). For example, the signal remover 106 outputs the reception signal u'2 without the transmission signal element u'1 to the demodulator 300 by offsetting the transmission signal u'1 of which the gain is adjusted from the reception signal u'1+u'2 transmitted from the counterpart terminal.

Accordingly, the signal restoring apparatus according to the exemplary embodiment of the present invention restores a reception signal of the counterpart terminal by estimating its own transmission signal from the reception signal transmitted from the counterpart terminal through the satellite communication device and removing the estimated transmission signal.

As described above, according to exemplary embodiments of the present invention, a signal restoring apparatus and a method thereof can increase frequency band efficiency by estimating its own transmission signal from a reception signal transmitted from a counterpart terminal through a satellite communication device and removing the estimated transmission signal.

According to exemplary embodiments of the present invention, a signal restoring apparatus of a terminal may restore a reception signal of a counterpart terminal by estimating its own transmission signal from the reception signal transmitted from the counterpart terminal through a satellite communication device and removing the estimated transmission signal.

As described above, the exemplary embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:
1. A signal restoring apparatus, comprising:
 a transmitter transmitting a transmission signal to a satellite communication device;

a band spread signal generator generating a band spread signal for estimating the transmission signal included in a reception signal when the transmission signal is received while being included in the reception signal transmitted from a counterpart terminal through the satellite communication device and transmitting the band spread signal to the satellite communication device;

a first receiver receiving the band spread signal transmitted from the satellite communication device;

a second receiver receiving the transmission signal transmitted from the counterpart terminal through the satellite communication device;

a signal estimator estimating the transmission signal included in the reception signal transmitted from the counterpart terminal on the basis of the transmission signal transmitted by the transmitter, the band spread signal transmitted by the band spread signal generator, and the band spread signal received from the satellite communication device; and a signal remover removing the transmission signal estimated by the signal estimator from the reception signal element transmitted from the counterpart terminal.

2. The apparatus of claim 1, wherein the signal estimator estimates parameters of the band spread signal received from the satellite communication device on the basis of the band spread signal generated by the band spread signal generator and estimates the transmission signal included in the reception signal transmitted from the counterpart terminal by applying the estimated parameters to the transmission signal transmitted by the transmitter.

3. The apparatus of claim 1, wherein the signal estimator estimates the transmission signal element to which a delay time, a frequency, a phase, and a gain are reflected by the satellite communication device.

4. The apparatus of claim 1, wherein the signal remover outputs the reception signal without the estimated transmission signal by offsetting the estimated transmission signal from the reception signal transmitted from the counterpart terminal.

5. The apparatus of claim 1, wherein the signal estimator includes:
  a parameter extracting unit extracting the parameter of the band spread signal received from the satellite communication device on the basis of the band spread signal generated by the band spread signal generator;
  a delay module delaying the transmission signal transmitted by the transmitter depending on a delay time in the parameter;
  a modulation module modulating a frequency and a phase of the delayed transmission signal depending on a frequency and a phase offset value in the parameter; and
  a gain adjusting module adjusting the gain of the frequency and phase modulated transmission signal depending on the gain in the parameter and outputting the transmission signal of which the gain is adjusted as the transmission signal included in the reception signal transmitted from the counterpart terminal.

6. The apparatus of claim 1, wherein the band spread signal is an orthogonal-element signal.

7. A signal restoring method, comprising:
  transmitting a transmission signal to a satellite communication device through a transmitter;
  generating a band spread signal for estimating the transmission signal included in a reception signal when the transmission signal is received while being included in a reception signal transmitted from a counterpart terminal through the satellite communication device and transmitting the band spread signal to the satellite communication device;
  receiving the band spread signal received from the satellite communication device;
  receiving the reception signal transmitted from the counterpart terminal through the satellite communication device;
  estimating the transmission signal included in the reception signal transmitted from the counterpart terminal on the basis of the transmission signal transmitted by the transmitter, the generated band spread signal, and the band spread signal received from the satellite communication device; and
  removing the estimated transmission signal from the reception signal elements transmitted from the counterpart terminal.

8. The method of claim 7, wherein the estimating of the transmission signal included in the reception signal transmitted from the counterpart terminal includes:
  estimating parameters of the band spread signal received from the satellite communication device on the basis of the generated band spread signal; and
  estimating the transmission signal included in the reception signal transmitted from the counterpart terminal by applying the estimated parameters to the transmission signal transmitted by the transmitter.

9. The method of claim 7, wherein in the estimating of the transmission signal included in the reception signal transmitted from the counterpart terminal, the transmission signal element to which a delay time, a frequency, a phase, and a gain are reflected is estimated by the satellite communication device.

10. The method of claim 7, wherein in the removing of the estimated transmission signal, the reception signal without the estimated transmission signal is outputted by offsetting the estimated transmission signal from the reception signal transmitted from the counterpart terminal.

11. The method of claim 7, wherein the estimating of the transmission signal included in the reception signal transmitted from the counterpart terminal includes:
  extracting the parameter of the band spread signal received from the satellite communication device on the basis of the generated band spread signal;
  delaying the transmission signal transmitted by the transmitter depending on a delay time in the parameter;
  modulating a frequency and a phase of the delayed transmission signal depending on a frequency and a phase offset value in the parameter; and
  adjusting the gain of the frequency and phase modulated transmission signal depending on the gain in the parameter and outputting the transmission signal of which the gain is adjusted as the transmission signal included in the reception signal transmitted from the counterpart terminal.

12. The method of claim 7, wherein the band spread signal is an orthogonal-element signal.

* * * * *